(12) United States Patent
Kleo et al.

(10) Patent No.: US 11,813,931 B2
(45) Date of Patent: Nov. 14, 2023

(54) GLAZED PANEL WITH A POLYMER PERIPHERY, REINFORCEMENT ARMATURES AND SECURING ARMATURES

(71) Applicant: SAINT-GOBAIN GLASS FRANCE, Courbevoie (FR)

(72) Inventors: Christophe Kleo, Attichy (FR); Li Zhao, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 506 days.

(21) Appl. No.: 16/651,837

(22) PCT Filed: Sep. 28, 2018

(86) PCT No.: PCT/FR2018/052398
§ 371 (c)(1),
(2) Date: Mar. 27, 2020

(87) PCT Pub. No.: WO2019/063954
PCT Pub. Date: Apr. 4, 2019

(65) Prior Publication Data
US 2020/0254858 A1    Aug. 13, 2020

(30) Foreign Application Priority Data

Sep. 29, 2017   (FR) ...................................... 1759079

(51) Int. Cl.
*B60J 7/02*       (2006.01)
*B60J 7/04*       (2006.01)
(Continued)

(52) U.S. Cl.
CPC ....... *B60J 7/0435* (2013.01); *B32B 17/10036* (2013.01); *B29K 2995/0026* (2013.01);
(Continued)

(58) Field of Classification Search
CPC ....... B60J 7/043; B60J 7/04; B60J 7/02; B60J 7/024; B60J 1/00; B60J 1/001;
(Continued)

(56) References Cited

U.S. PATENT DOCUMENTS

| 7,108,317 B2 * | 9/2006 | Tamura | ...................... B60J 7/22 296/218 |
| 10,040,238 B2 * | 8/2018 | Blanc | ...................... B29C 53/08 |

(Continued)

FOREIGN PATENT DOCUMENTS

| CN | 201502271 U | 6/2010 |
| CN | 204186256 U | 3/2015 |

(Continued)

OTHER PUBLICATIONS

International Search Report as issued in International Patent Application No. PCT/FR2018/052398, dated Feb. 26, 2019.
(Continued)

*Primary Examiner* — Dennis H Pedder
*Assistant Examiner* — Joyce Eileen Hill
(74) *Attorney, Agent, or Firm* — Pillsbury Winthrop Shaw Pittman LLP (57) ABSTRACT

A glazed panel includes a glass panel, two longitudinal reinforcement armatures in order to reinforce the glass panel against deformations by flexure, and two longitudinal securing armatures in order to secure the glazed panel in an outer structure provided for this purpose. The armatures can be overmolded in a polymer material which is arranged on the periphery of the glass panel. The two reinforcement armatures and the two securing armatures are joined in pairs by their longitudinal ends in order to form a frame by means of an assembly by nesting, optionally using an intermediate part. This measure makes it possible to reduce the concentrations of stresses in the corners of the glass panel, and simplifies the molding operation during the production of the glazed panel.

28 Claims, 6 Drawing Sheets

(51) Int. Cl.
*B60J 7/043* (2006.01)
*B60J 1/00* (2006.01)
*B32B 15/04* (2006.01)
*B32B 17/10* (2006.01)

(52) U.S. Cl.
CPC ......... *B32B 15/04* (2013.01); *B32B 17/10293* (2013.01); *B32B 17/10541* (2013.01); *B32B 2605/08* (2013.01); *B60J 1/00* (2013.01); *B60J 1/007* (2013.01); *B60J 7/02* (2013.01); *B60J 7/024* (2013.01); *B60J 7/04* (2013.01); *B60J 7/043* (2013.01)

(58) Field of Classification Search
CPC ........ B60J 1/007; E06B 7/04; B32B 17/0036; B32B 17/10293; B32B 17/10541; B32B 15/04; B32B 5/02; B32B 5/024; B32B 2605/08; B32B 7/12; B29K 2995/0026
USPC .... 296/216.01, 216.06, 216.07, 216.09, 211, 296/215, 901.01
See application file for complete search history.

(56) References Cited

U.S. PATENT DOCUMENTS

| | | | |
|---|---|---|---|
| 2005/0170191 A1* | 8/2005 | Huchet | B60J 7/00 428/426 |
| 2007/0040416 A1* | 2/2007 | Bordeaux | B32B 17/10293 296/216.09 |
| 2007/0212524 A1* | 9/2007 | Erbeck | B32B 17/10018 428/192 |
| 2010/0276969 A1* | 11/2010 | Auchter-Bruening | B62D 25/06 29/530 |
| 2014/0054933 A1* | 2/2014 | Kanai | B60J 7/0435 296/216.05 |
| 2016/0185189 A1* | 6/2016 | Gon | B60J 10/265 52/204.55 |
| 2019/0299760 A1 | 10/2019 | Fukada et al. | |

FOREIGN PATENT DOCUMENTS

| | | |
|---|---|---|
| CN | 206124701 U | 4/2017 |
| EP | 2 700 521 A2 | 2/2014 |
| JP | 2005-525947 A | 9/2005 |
| JP | 2014-040162 A | 3/2014 |
| JP | 2017-132423 A | 8/2017 |
| WO | WO 2017/152980 A | 9/2017 |

OTHER PUBLICATIONS

Second Office Action as issued in Chinese Patent Application No. 201880003545.4, dated Jun. 30, 2022.
Notice of Reasons for Rejection as issued in Japanese Patent Application No. 2020-517459, dated Jun. 21, 2022.
Third Office Action as issued in Chinese Patent Application No. 201880003545.4, dated Oct. 17, 2022.
Decision of Refusal as issued in Japanese Patent Application No. 2020-517459, dated Jun. 6, 2023.

* cited by examiner

GLAZED PANEL WITH A POLYMER PERIPHERY, REINFORCEMENT ARMATURES AND SECURING ARMATURES

CROSS-REFERENCE TO RELATED APPLICATIONS

This application is the U.S. National Stage of PCT/FR2018/052398, filed Sep. 28, 2018, which in turn claims priority to French patent application number 1759079 filed Sep. 29, 2017. The content of these applications are incorporated herein by reference in their entireties.

The present invention relates to a glazed panel with a polymer periphery, reinforcement armatures and securing armatures, in particular for a roof of a motor vehicle.

The tops or roofs of motor vehicles are subject to low pressure because of the aerodynamism of the vehicle which increases with the speed of travel of the vehicle. This results in mechanical forces which subject the roof to stress upwards: this phenomenon is habitually known as the windload effect. When the tops are equipped with a glazed panel, it is subjected to forces which apply stress to the glazed panel, in particular in flexure, and the panel must therefore be able to withstand this.

When it is fitted in the top, the glazed panel is protected against excessive deformation by being secured on the body of the vehicle.

In the case of a top glazed panel associated with a translation mechanism in order to form an opener, the glass panel, which is conventionally made of toughened monolithic glass 3 to 5 mm thick, is reinforced against deformations in flexure generated by the windload effect by means of a longitudinal metal armature which is rendered integral with the glass panel along the front edge of the panel, and another along the rear edge of the glazed panel. In addition, two other longitudinal metal armatures are rendered integral along the lateral edges on the glass panel, and make it possible to secure the glazed panel by means of the translation mechanism in a corresponding opening provided in the top of the motor vehicle. The glazed panel is also provided on its periphery with a polymer material, habitually polyurethane. The reinforcement armatures are habitually completely encapsulated in the polymer material, and the securing armatures are partly encapsulated, in order to render them integral with the glass panel.

Because of the risk of breakage of this type of glazed panel into small pieces in the case of impact, and the resulting disadvantages, use is being made increasingly of laminated glass optionally reinforced by heat treatments or chemical treatments. However, this glass is more flexible than monolithic glass, in particular because of its interposed sheet of plastic material. In addition, the trend at present is to lighten the roof by reducing the thickness of the glass sheets which constitute the laminated glass, which increases further the flexibility of the glass panel.

This results in risk of deformation of the glass panel because of the windload effect, which can lead to sealing faults, or to breakage of the glass if its deflection exceeds its rupture strength. Furthermore, the glazed panels must be able to withstand mechanical resistance tests, consisting of suspending them by the corners and loading them in the center. However, the invention has made it possible to identify an increased risk of breakage in the region of the corners of the glass panel.

According to a first aspect, the objective of the present invention is to eliminate this disadvantage. For this purpose, the invention proposes to connect in pairs the two reinforcement armatures and the two securing armatures, by means of their longitudinal ends, in order to form a frame. Thus, the glass panel is supported at the front and at the rear over all of its transverse part as far as the securing armatures, without interruption, unlike the prior art which generally leaves a space of 1 to 10 mm between them, and sometimes more. As a result, the concentrations of stress in the corners of the glass panel are reduced, which makes it possible to reduce, or even eliminate the risk of breakage associated with the windload effect, or during the aforementioned tests of mechanical resistance under load.

It could be envisaged to produce the reinforcement armatures and the securing armatures in the form of a frame by molding, by forming or by welding. However, these solutions all have the disadvantage of being costly. Thus, the production of the frame by molding involves using a large-sized mold, which is costly, but also a high-performance molding material, which is therefore also costly, from the point of view of the mechanical resistance and the temperature resistance (taking into account the temperatures to which the glazed panel may be exposed in its final application). In addition, the production of securing armatures made of composite plastic material poses problems in terms of mechanical resistance at the securing openings with which they are provided. Production in the form of a frame by forming of a metal part involves not only many operations, in particular bending and cutting operations in order to structure the securing armatures, but also leads to a substantial loss of material, since the structure of the securing armatures is lighter than that of the reinforcement armatures, because the former do not fulfil a function of reinforcement of the glass panel, or only do so secondarily. Similarly, the assembly of the reinforcement armatures and the securing armatures to one another by welding is also complex and costly.

Unlike these approaches, an opener for a motor vehicle top is known from EP 2 700 521 A2 wherein four distinct metal reinforcement armatures are rendered integral on the inner face of the glass panel of the opening, one at the front of the glass panel, another at the rear, and two others on a lateral side, respectively, of the glass panel. The lateral armatures are also used for securing the opener to a translation mechanism. The front armature is secured on the glass panel by a rubber seal or the like arranged on the front edge of the glass panel, whereas the lateral armatures and the rear armature are secured on the glass panel by an adhesive. The four armatures are disposed on the glass panel, whilst being joined in pairs by means of their ends in each case by means of a respective intermediate plastic part, and therefore form a frame on the glass panel. The intermediate plastic parts are also secured on the glass panel by an adhesive or the like.

Each intermediate part has a portion which is inserted in the end of a front or rear armature, with the insertion taking place in the longitudinal direction of the front or rear armature concerned. On the other hand, the lateral armatures have a transverse cross-section which is open in the form of a "U", such that the end of the lateral armature can be engaged maintenance-free on a corresponding portion of the intermediate part, in a direction perpendicular to the longitudinal direction of the lateral armature. Thus, the armatures are secured on the glass panel one after another. This solution continues to be complex and intricate from the point of view of putting the armatures into place on the glass panel, for the purpose of rendering them integral on the latter.

WO 2017/152980 A1 also describes a top opener of a motor vehicle, the glass panel of which is reinforced. In particular, it proposes to produce a front reinforcement armature and a rear reinforcement armature made of plastic material reinforced by fibers, and two lateral armatures produced, depending on the circumstances, from metal, or also from plastic material reinforced by fibers. Depending on the circumstances, the armatures are secured on the glass panel by adhesion and/or encapsulation, such as to form a frame between one another. It is apparent from the document that the putting into place of the armatures relative to the glass panel for the purpose of rendering them integral is also carried out in succession, which has the disadvantage that this solution, similarly to that of the preceding document, is complex and intricate from the point of view of putting the armatures into place on the glass panel, for the purpose of rendering them integral on the latter.

In order to eliminate these disadvantages at least partly, according to its first aspect, the invention proposes a frame designed to be rendered integral with a glass panel, comprising:
  two longitudinal reinforcement armatures in order to reinforce the glass panel against deformations by flexure; and
  two longitudinal securing armatures in order to secure the glazed panel in an outer structure designed to receive the glazed panel;
wherein:
  the two reinforcement armatures and the two securing armatures are joined in pairs by means of their longitudinal ends, in order to form the frame; and
  at least one end or each of the longitudinal ends of one or each of the reinforcement armatures is joined to the corresponding longitudinal end of the adjacent securing armature by means of a nesting assembly.

The fact of joining the reinforcement armatures and the securing armatures in the form of a frame before they are rendered integral with the glass panel of the glazed panel, and therefore independently from the latter, simplifies their putting into place on the glass panel for the purposes of rendering integral, since there is now only a single element to be handled and placed on the glass panel or relative to the latter, i.e. the frame, instead of the four armatures individually, and possibly also the intermediate connection parts. This results in a saving in production time, and irrespective of whether the rendering integral is carried out by overmolding and/or adhesion.

The fact of using a nesting assembly makes it possible to join the reinforcement armature and the securing armature simply, rapidly and economically. In addition to the nesting, the assembly can optionally be completed for example by adhesion, or by resilient snapping-in of the end of one of the armatures into that of the other, or into the intermediate connection part, which makes it possible to ensure or complete the relative retention in position of the two parts. If their material permits it, there can also be one or a plurality of welding spots rendering the two nested parts integral, with the nesting simplifying the welding operation in this case. However, it is particularly advantageous for the assembly to be carried out exclusively by nesting, since this solution is particularly simple, rapid and economical. In this case, it is advantageous for the nesting to take place with clamped adjustment. The level of clamping is preferably selected appropriately in order to permit manual nesting, whilst providing relative retention in position of the parts concerned, which makes possible the subsequent handling of the resulting frame, without disengagement of the parts from one another.

It is advantageous to implement this assembly mode at each of the ends of the two reinforcement armatures. This makes it possible to design and produce the reinforcement armatures and the securing armatures independently: they can thus have their own characteristics adapted to their respective functions, whilst facilitating their respective production. This then makes it possible to assemble them in the form of a frame simply, rapidly and economically. In particular, this avoids the aforementioned disadvantages of the solutions of molding, forming or welding. In addition, it is possible to use different materials for the reinforcement armatures and the securing armatures, for example a composite material for the reinforcement armatures and a metal material for the securing armatures.

Since an opener for a motor vehicle top is concerned, the invention according to this first aspect is particularly suitable for the case of glazed panels, the glass panel of which is made of laminated glass, in particular bi-laminated glass, and for a surface area of 0.4 $m^2$ or more, since the panels are more exposed to the risk of breakage in the corners than smaller panels.

According to preferred embodiments, this frame according to this first aspect of the invention comprises one or a plurality of the following characteristics:
  said assembly is produced by nesting with clamped adjustment;
  at least one or each of the longitudinal ends of one or each of the reinforcement armatures is joined to the corresponding longitudinal end of the adjacent securing armature exclusively by means of an assembly by nesting with clamped adjustment;
  said assembly by nesting comprises a first nesting between the longitudinal end of the reinforcement armature and an intermediate connection part, and a second nesting between the longitudinal end of the securing armature and said intermediate connection part;
  the first nesting and the second nesting are each with clamped adjustment;
  said assembly comprises nesting of the longitudinal end of the reinforcement armature, and nesting of the longitudinal end of the securing armature, in a single intermediate connection part;
  the distance which separates the longitudinal end of the reinforcement armature and the longitudinal end of the securing armature which are nested in a single intermediate connection part is less than 30 mm, preferably less than 20 mm, more preferably less than 10 mm, and more preferably less than 5 mm;
  said assembly comprises nesting of the longitudinal end of the reinforcement armature and of the longitudinal end of the securing armature directly in one another;
  the longitudinal end of the securing armature has a bent part facing towards the adjacent longitudinal end of the reinforcement armature, wherein the bent part is used for the assembly by nesting;
  one or each of the reinforcement armature(s) is made of a metal material;
  at least one of the reinforcement armatures is made of composite material, and is produced in the form of a profiled part reinforced by longitudinal ribs and/or transverse ribs;
  the securing armatures are made of metal material;
  the two reinforcement armatures and the two securing armatures are joined in pairs by means of their longitudinal ends, such as to ensure sufficient retention between them to be able to handle the frame without disassembling it, before rendering it integral with the glass panel;

the securing armatures 41 have a negligible effect in comparison with the reinforcement armatures from the point of view of the rigidification of the glazed panel.

Still according to this first aspect, the invention also proposes a glazed panel comprising:

a glass panel with:
- a first and a second main faces; and
- a periphery, which defines for the glass panel a front edge, a rear edge, and a first and a second lateral edge which each extend between the front edge and the rear edge;

a peripheral polymer material arranged on the periphery of the glass panel; and a frame according to the aforementioned first aspect of the invention, which is rendered integral with the first main face of the glass panel;

wherein:

each of the reinforcement armatures of the frame is rendered integral on the first main face of the glass panel, the first in a region along the front edge and the second in a region along the rear edge; and each of the securing armatures of the frame is rendered integral on the first main face of the glass panel, the first in a region along the first lateral edge and the second in a region along the second lateral edge.

According to preferred embodiments, the glazed panel comprises one or a plurality of the following characteristics:

the reinforcement armatures, and if applicable the intermediate connection parts, are completely encapsulated in the peripheral polymer material and the securing armatures are partly overmolded by the peripheral polymer material;

the reinforcement armatures and the securing armatures are situated completely outside the peripheral polymer material;

one or each of the reinforcement armatures comprises a face positioned facing the glass panel, which face forms a substantially continuous solid surface along the entire length of the reinforcement armature;

at least one of the reinforcement armatures is a part profiled in the form of an "I", and is placed facing the glass panel with a face defined by one of the two horizontal bars of the "I";

the reinforcement armature in the form of a part profiled in the form of an "I" is encapsulated in the peripheral polymer material, two longitudinal cavities which are hollow or filled with a different polymer material being arranged along the reinforcement armature, i.e. one on each side of the vertical upright of the cross-section in the form of an "I" between the two horizontal bars of the cross-section in the form of an "I";

at least one of the reinforcement armatures is a part profiled in the form of a "U", and is placed facing the glass panel with a face defined by the horizontal bar of the cross-section in the form of a "U" which connects to one another the two vertical uprights of the cross-section in the form of a "U" at a first one of their ends, the vertical uprights of the "U" each being extended at their second ends by a horizontal portion oriented towards the outside of the "U";

at least one of the reinforcement armatures is a profiled part, the transverse cross-section of which is constituted by a first and second portion each with a substantially square or rectangular cross-section, and spaced from one another whilst being joined to one another by an extension of one of their respective sides, the reinforcement armature being placed against the glass panel with the face defined by said respective sides which are extended;

the glass panel is made of bi-laminated glass, and comprises a first sheet of glass with a thickness of 0.7 to 3.1 mm, more preferably 0.7 to 2.1 mm, and a second sheet of glass with a thickness of 1.4 to 3.1 mm, with the first sheet of glass preferably defining the first main face of the glass panel, and the second sheet of glass defining the second main face of the glass panel;

the peripheral polymer material is arranged around the entire periphery of the glass panel.

The glass panel according to this first aspect of the invention can also be used in applications other than motor vehicles, for example in property construction buildings or in boats.

According to another aspect, the invention also proposes a motor vehicle comprising a glazed panel according to the first aspect of the invention, which is fitted in the top of the vehicle, preferably forming an opener, with the two reinforcement armatures extending transversely relative to the motor vehicle.

According to yet another aspect, the invention proposes a method for production of a glazed panel according to the first aspect of the invention, comprising the steps of:

a) formation of a frame with four sides, two opposite sides of which are defined by two longitudinal reinforcement armatures, and two other, opposite sides are defined by two longitudinal securing armatures, the longitudinal ends of the reinforcement armatures each being joined to a corresponding end of one of the securing armatures;

b) putting into position in a mold the frame thus formed and a glass panel;

c) filling the mold with a polymer material in order to add polymer material to the periphery of the glass panel which partly overmolds the securing armatures and encapsulates the reinforcement armatures;

wherein the step a) comprises the fact of joining at least one or each of the longitudinal ends of one or each of the reinforcement armatures to the corresponding longitudinal end of the adjacent securing armature by means of an assembly by nesting.

According to preferred embodiments, the method according to this aspect of the invention comprises one or a plurality of the following characteristics:

the step a) comprises the fact of adding at least one or each of the longitudinal ends of one or each of the reinforcement armatures to the corresponding longitudinal end of the adjacent securing armature exclusively by nesting with clamped adjustment;

the step a) comprises the fact of nesting the longitudinal end of the reinforcement armature and the corresponding longitudinal end of the adjacent securing armature in an intermediate connection part;

the step b) comprises the fact of putting the frame into position and retaining it in position in the mold exclusively by means of the securing armatures.

More generally, the invention proposes a method for production of a glazed panel according to the first aspect of the invention, comprising the steps of:

a) providing or forming a frame according to the first aspect of the invention, then b) rendering the frame integral with a main face of the glass panel.

According to preferred embodiments, this last method comprises one or a plurality of the following characteristics:

in the step b), rendering integral is carried out between the main face of the glass panel and each reinforcement armature, and between the main face of the glass panel and each securing armature;

in the step b), rendering integral is also carried out between the main face of the glass panel, and between each intermediate connection part;

the step b) comprises:
b1) putting the frame and the glass panel into position in a mold; and
b2) filling the mold with a polymer material in order to add polymer material to the periphery of the glass panel which material partly overmolds the securing armatures and encapsulates the reinforcement armatures;

in the sub-step b2), the reinforcement armatures, and if applicable the intermediate connection parts, are completely encapsulated by the polymer material;

the sub-step b1) comprises putting into position and retention in position of the frame in the mold exclusively by means of the securing armatures;

rendering integral of the reinforcement armatures and of the securing armatures, as well as, if applicable, the intermediate connection parts, on the glass panel, is ensured exclusively by the polymer material.

It will be understood that, within the context of the invention, the glass panel can be constituted by one or a plurality of sheets of mineral glass, but also by one or a plurality of sheets of organic glass, for example made of polycarbonate or methyl polymethacrylate.

Other aspects, characteristics and advantages of the invention will become apparent from reading the following description of preferred embodiments of the invention, provided by way of example, and with reference to the appended drawing.

Figure 1:
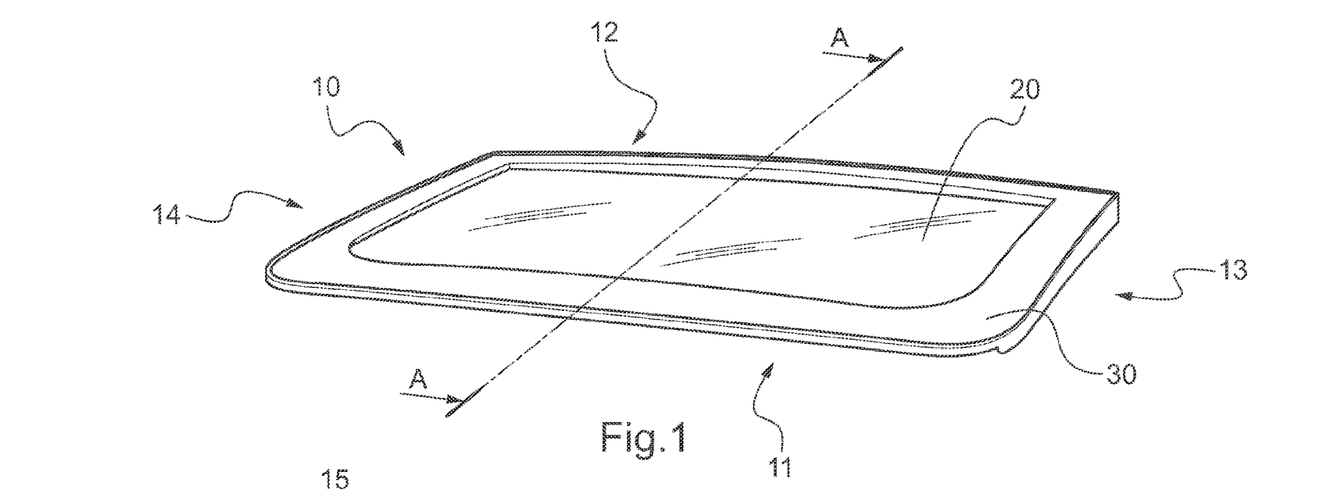
FIG. 1 represents a schematic view in perspective from above of a glazed panel for a motor vehicle roof according to an embodiment of the invention.
Figure 2:
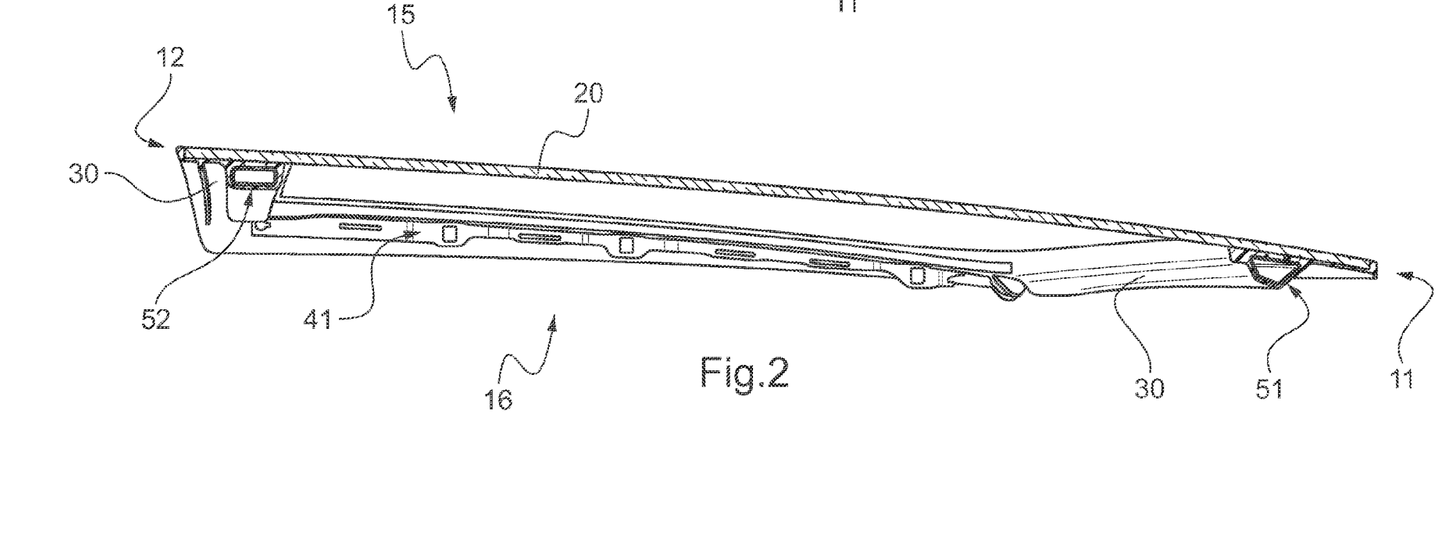
FIG. 2 represents a schematic view in cross-section A-A of the glazed panel according to FIG. 1.

With reference to FIGS. 1 and 2, a description will be provided of a glazed panel 10 according to a first embodiment. In this example, this is an opener for a motor vehicle top, which is designed to be fitted in an opening in the top provided for this purpose by means of a mechanism which makes it possible to displace it between a closed position and an open position.

The glazed panel 10 has two main faces, i.e. an upper face 15 and a lower face 16, corresponding respectively to the outside of the vehicle and the inside of the passenger space of the vehicle after the panel has been fitted in the vehicle roof. The glazed panel 10 comprises a front edge 11 and a rear edge 12, as well as two lateral edges 13, 14. In this case, the concepts front, rear and lateral define the orientation of the glazed panel after installation in the top of the motor vehicle, corresponding respectively to the front, rear and lateral sides of the motor vehicle.

The glazed panel 10 comprises a glass panel 20, preferably a laminated glass, and more preferably a bi-laminated glass with two sheets of glass, between which there is arranged an interposed layer of polymer material, for example polyvinylbutyral (PVB). Since application to a motor vehicle is involved, the outer sheet of glass preferably has a thickness of 1.4 to 3.1 mm, whereas the inner sheet of glass preferably has a thickness of 0.7 to 3.1 mm, more preferably of 0.7 to 2.1 mm. The concept of inner and outer refers respectively to the inside and outside of the passenger space of the vehicle. Alternatively, the glass can be a monolithic glass.

The glass panel 20 is provided with a polymer material 30 around its entire periphery. It can advantageously ensure the finishing of the periphery of the glass panel 20, and protect it against mechanical impacts. For this purpose, the portion of the glass panel 20 is preferably covered entirely by the polymer material 30. The polymer material can also form a surface which is designed to co-operate with one or a plurality of seals which are secured in the opening of the motor vehicle top, in order to ensure the sealing between the top and the glazed panel in the closed position. Conversely, the polymer material 30 can itself support one or a plurality of peripheral seals for this same purpose. In addition, parts can be integrated in the polymer material 30, such as stops or sliding buffers, centering studs, a decorative strip, etc. The polymer material 30 is preferably polyurethane, but it can be any other appropriate material, in particular a plastic material. The polymer material 30 is preferably arranged on the glass panel 20 by overmolding.

As can be seen in FIG. 2, the glazed panel 10 comprises a reinforcement armature 51 which is rendered integral with the glass panel 20 in the region of the front edge 11, and another reinforcement armature 52 which is rendered integral with the glass panel 20 in the region of the rear edge 12. The two reinforcement armatures 51 and 52 serve the purpose of rigidifying the glass 20, in order to limit its flexure, in particular under the windload effect, and thus assist maintenance of the intactness of the glass panel 20, and the sealing between the glazed panel 10 and the motor vehicle top. The reinforcement armatures 51, 52 are preferably completely encapsulated in the polymer material 30 at the periphery of the glass panel 20.

In addition, the glazed panel 10 comprises a securing armature 41 which extends along the right edge region of the glazed panel 10, and another armature, not shown, along the left edge region of the glazed panel 10. The armatures have a longitudinal form, i.e. an elongate form, and extend substantially along the entire length of the glass panel 20. They are used to secure the glazed panel 10 on a translation mechanism of the opener which is designed for fitting of the glazed panel 10 in an opening of the motor vehicle top, making it possible to displace the glazed panel 10 between an open position and a closed position. The securing on the opener translation mechanism is carried out at different points between the front edge 11 and the rear edge 12, by any appropriate means such as screws or rivets. For this purpose, the securing armatures 41 have openings or securing eyelets, in particular for the passage of the screws, rivets, or other securing elements. These securing armatures 41 are integrated only partly in the seal 30, in order to leave the openings or securing eyelets accessible. The securing armatures 41 are preferably made of metal material, since this is more suitable for providing appropriate resistance to rupture at the openings or securing eyelets than a plastic or composite material. The armatures are preferably produced by means of operations of profiling, cutting and stamping. From the point of view of the rigidification of the glazed panel 10, the securing armatures 41 habitually have only a negligible effect compared with the reinforcement armatures 51, 52. Consequently, the securing armatures 41 can have a transverse cross-section in the form of an "L", and their wall thickness can be thinner than that of the securing armature, in the case when they are all made of metal material.

The polymer material 30 alone preferably ensures all the rendering integral of the reinforcement armatures 52 and the securing armatures on the glass panel 41. Alternatively or in addition, the reinforcement armatures 52 and/or the securing armatures 41 are secured by adhesive on the glass panel 20 (before application of the polymer material 30 onto it). A double-sided adhesive strip or a glue can be used.

The reinforcement armatures 51 and 52 and the securing armatures 41 are preferably arranged on the lower face 16 of the glass panel 20.

The reinforcement armatures 51 and 52 have a longitudinal form, i.e. an elongate form, and extend substantially from the securing armature 41 of the left-hand side of the glass panel 20, to the securing armature 41 of the right-hand side of the glass panel 20, which makes it possible to ensure efficiently the function of rigidification of the glass panel 20.

Each of the reinforcement armatures 51 and 52 is preferably designed in the form of a profile. The transverse cross-section of the profile is selected appropriately to provide the reinforcement armature with the required rigidity. The reinforcement armatures 51, 52 can be profiles with the same cross-section or a different cross-section: this last case is illustrated by FIG. 2.

Irrespective of the profile cross-section selected, the selection of the height h and the width of each reinforcement armature 51 and 52 is made in particular taking into consideration the rigidification to be provided for the glass panel 20, and the space available in the final application. From this point of view, the height h of each of the reinforcement armatures 51 and 52 is preferably set to a given value selected from 8 to 30 mm, and more preferably from 8 to 20 mm, since this is an application for a motor vehicle top. The height h is understood to be the dimension of the profile measured in the direction perpendicular to the main surface 16 of the glass panel 20, after assembly of the glazed panel 10. The width of each of the reinforcement armatures 51 and 52 is preferably selected to be between 15 and 50 mm.

It should be remembered that the resistance to flexure provided by a profile depends substantially on the form of its cross-section and the height which it has in the direction of the flexure forces which are applied to it, as well as on its component material.

Figures 3, 4, 5, 6:
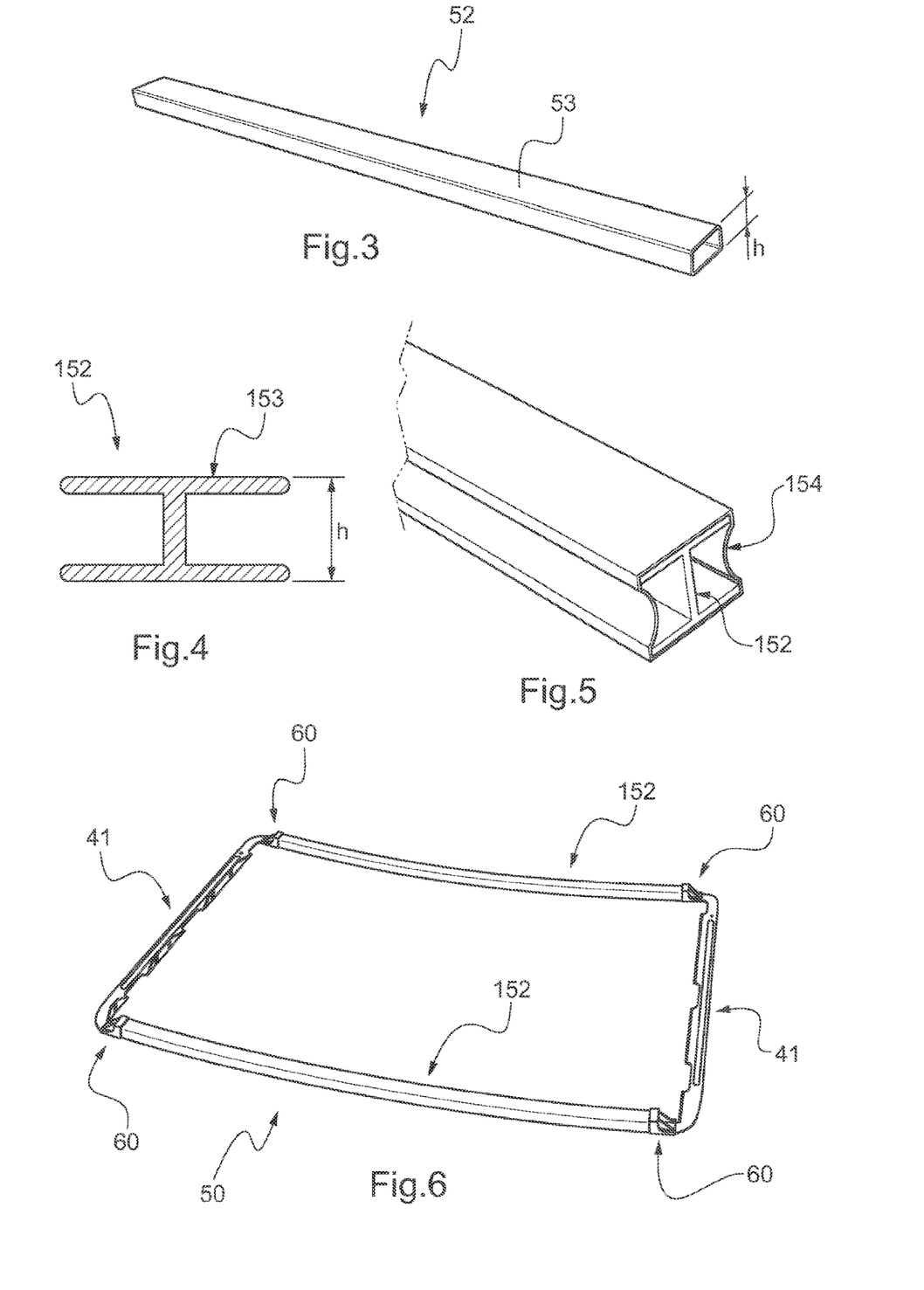
FIGS. 3 and 4 illustrate two examples of configuration of the reinforcement armatures integrated in the polymer material at the periphery of the glazed panel in FIGS. 1 and 2.
FIG. 5 illustrates the reinforcement armature in FIG. 4, but completed by a skin which surrounds it.
FIG. 6 illustrates an example of two reinforcement armatures and two securing armatures assembled in the form of a frame, by nesting of their ends in respective connection parts, before rendering integral on a glass panel.
Figure 11:
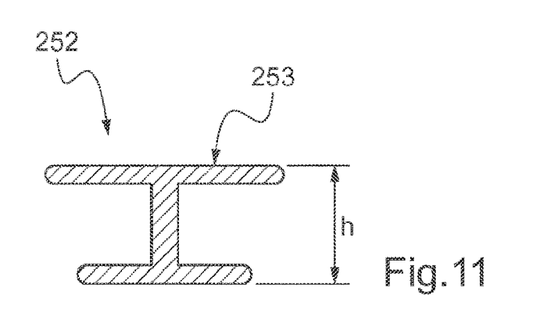
FIGS. 11 to 16 illustrate different examples of configuration of the reinforcement armatures.

The reinforcement armatures 51, 52 can be made of metal material. FIG. 3 illustrates the conventional case of a profile with a rectangular cross-section. However, it is more advantageous to use a profile in the form of an "I", as illustrated by FIG. 4, in which the reinforcement armature has the reference 152. In fact, for an identical volume of material, a transverse cross-section in the form of an "I" provides better resistance to flexure than other profile cross-sections. In the example in FIG. 4, the cross-section in the form of an "I" is symmetrical. As a variant, the cross-section in the form of an "I" can be asymmetrical, i.e. one of the horizontal bars, preferably the one that faces the glass panel 20, is longer than the other: cf. the illustration in FIG. 11, in which the reinforcement armature has the reference 252.

With a profile with a cross-section in the form of an "I", the reinforcement armature 152 can advantageously be surrounded by a skin 154, thus providing a respective longitudinal cavity on both sides of the vertical upright of the "I", between its two horizontal bars: cf. the illustration in FIG. 5. After encapsulation of the reinforcement armature 152 in the peripheral polymer material 30, these two longitudinal cavities remain. Consequently, they make it possible both to save polymer material, and to lighten the glazed panel 10. The skin 154 is preferably made of polymer material. It can be a heat-shrink sheath, for example made of polyolefin. An example is the sheath which is sold under the reference HSR 3000 by the company 3M. Use of a heat-shrink sheath is also advantageous because it makes it possible to dispense with particular preparation of the surface of the reinforcement armature. In particular, it is possible to eliminate the cataphoresis treatment which is habitually applied to the reinforcement armature in the case of the prior art where the reinforcement armature is not provided with a skin of this type. Alternatively, the skin 154 can be made of a polymer material with natural adhesion both to the polymer material 30 and to that of the reinforcement armature. For example, if the peripheral material 30 is polyurethane, and the reinforcement armature is made of a metal material, the skin 152 can be made of polyurethane.

As an alternative to the skin 154, the two longitudinal cavities defined on both sides of the vertical upright of the "I", between its two horizontal bars, can be previously filled with an economical plastic material, for example a polyurethane foam, in order to provide the same advantages.

Figure 12:
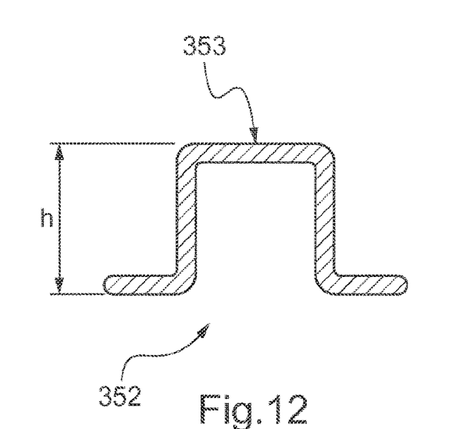
Figure 14:
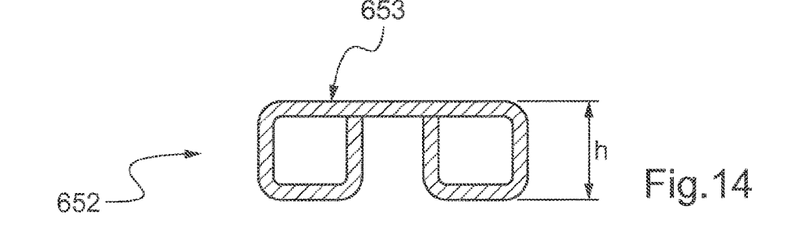

When the space available in the final application permits it, it is advantageous to select a profile cross-section which can be produced by profiling (also known as roll forming), which makes it possible to reduce the production costs of the reinforcement armature. In this case, for the same volume of material, a profile which can be obtained by profiling is generally less high-performance than a profile in the form of an "I", from the point of view of mechanical resistance to flexure. However, it is possible to make the performance close to that of the latter by selecting carefully the cross-section of the profile. From this point of view it is advantageous to use a profile with a transverse cross-section in the form of a "U", the vertical uprights of which are extended by a horizontal portion: cf. the illustration in FIG. 12 in which the reinforcement armature has the reference 352. The two horizontal portions also make it possible advantageously to ensure anchoring of the reinforcement armature in the polymer material 30. Again from this same point of view, it is even more advantageous to use a profile with a transverse cross-section comprising two squares or rectangles which are spaced from one another, but are joined to one another by the extension of one of their respective sides: cf. the illustration in FIG. 14 in which the reinforcement armature has the reference 352.

Figure 10:
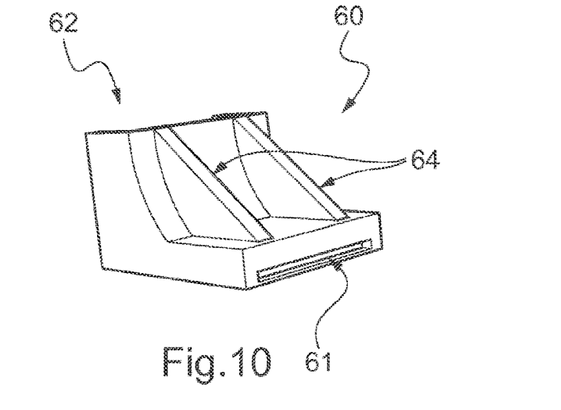
Figure 13:
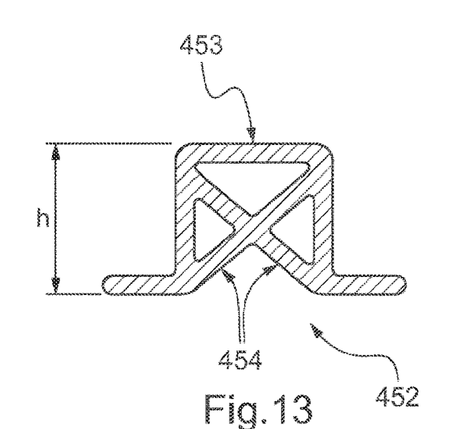

If it is desirable to increase the rigidity of the reinforcement armature for an identical size, the profile can be completed by longitudinal ribs: cf. for example the case of the profile with a structure in the form of a "U" in FIG. 10, completed by two longitudinal ribs 452 disposed diagonally, and intersecting as illustrated by FIG. 13, where the reinforcement armature has the reference 452. However, a profile of this type can be obtained only by extrusion, which is costly.

Alternatively, one and/or the other of the reinforcement armatures 51 and 52 is/are made of a composite material. This is selected appropriately taking into account the final application. For a glazed panel for a motor vehicle top, a composite material is selected with a vitreous transition temperature of 70° C. or more. This characteristic makes it possible to ensure the integrity of the function of rigidification of the reinforcement armatures 51 and 52, after installation on a motor vehicle, taking into account the maximum temperatures to which the vehicle is liable to be exposed in normal use, i.e. approximately 60° C., but which can be as much as 120° C. in tests to which the glazed panels are subjected.

The fact of making the reinforcement armatures 51, 52 of composite material makes it possible to reduce their weight, but their use generally presupposes an available height in the final application which is greater that in the case of the armatures made of steel, because the Young's modulus of the composite materials is habitually lower.

Figure 15:
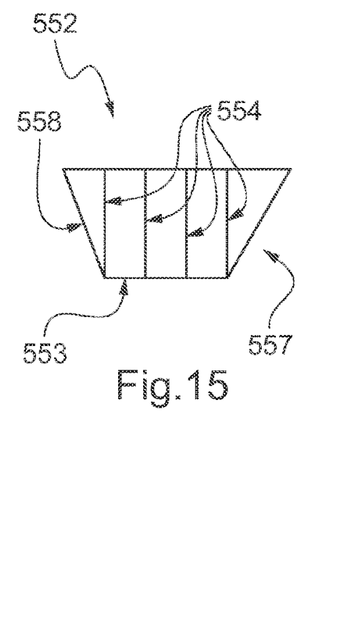
Figure 16:
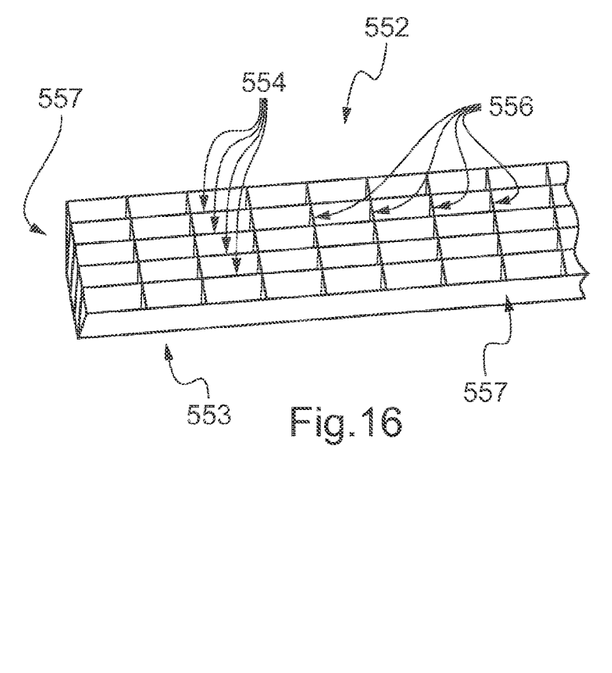

If the Young's modulus of the composite material selected is substantially lower than that of steel, this difference can be compensated for at least partly by defining a more complex profile form, optionally completed by reinforcement ribs in order to maintain the height 'h' of the reinforcement armature at a similar level to the case when the reinforcement armature is made of steel. The reinforcement ribs can extend longitudinally and/or transversely. Another example which improves further the mechanical resistance to flexure is illustrated schematically by FIGS. 15 and 16, showing respectively a front view and view in perspective of a reinforcement armature with the reference 552. It is based on a profile with two outer lateral walls 557 and 558, and a base wall 553 which all three extend along the entire length of the reinforcement armature 552. Between these three walls 553, 557 and 558 vertical longitudinal reinforcement ribs 554 extend. In addition, transverse reinforcement ribs 556 are arranged between these three walls 553, 557 and 558 at intervals with a regular distance.

By way of example, the composite material can be:
a polyphthalamide (PPA) reinforced with 30% by weight of glass fibers or carbon fibers, and with an adequate vitreous transition temperature, in particular those of the Grivory® HT2C-3X range by the EMS-GRIVORY group;
a polyetheretherketone (PEEK) reinforced with 30% by weight of carbon fibers;
an epoxy resin reinforced with 30% by weight of carbon fibers, and having an adequate vitreous transition temperature.

The reinforcement armatures are not placed in contact with the surface of the glass, but are separated from it either by a layer of polymer material, preferably with a thickness of 1.5 to 3 mm, added to the peripheral polymer material 30 during its overmolding, or if applicable by the adhesive for securing the reinforcement armatures on the glass panel 20.

In the case when the reinforcement armatures are rendered integral with the glass panel exclusively by the peripheral polymer material 30, it is preferable for this to be a face of the armatures which forms a substantially continuous solid surface disposed facing the main surface 16 of the glass panel 20, irrespective of whether the reinforcement armatures are made of metal material or composite material: cf. the references 53, 153, 253, 353, 453, 553 and 653 for the different reinforcement armatures illustrated in the figures. This makes it possible to prevent or at least limit the appearance of detrimental mechanical stresses on the glass panel 20 in the area of the reinforcement armature during the overmolding by injection of the peripheral polymer material 30, because of a phenomenon of shrinkage of the polymer material inside the reinforcement armature, if it has a hollow profile open towards the glass panel 20. It will be appreciated that, if securing by means of adhesive is used, it is also preferable for a face of the reinforcement armature forming a substantially continuous solid surface to be disposed facing the main surface 16 of the glass panel 20, since this will make possible efficient adhesion of the reinforcement armature on the glass panel 20.

It will be appreciated that it is possible to make only one of the two reinforcement armatures of composite material as previously described, and to make the other armature of metal material such as steel. Similarly, the two reinforcement armatures can have a structure which is identical or different, in particular as far as the form of their transverse cross-sections or their dimensions is concerned.

Figure 7:
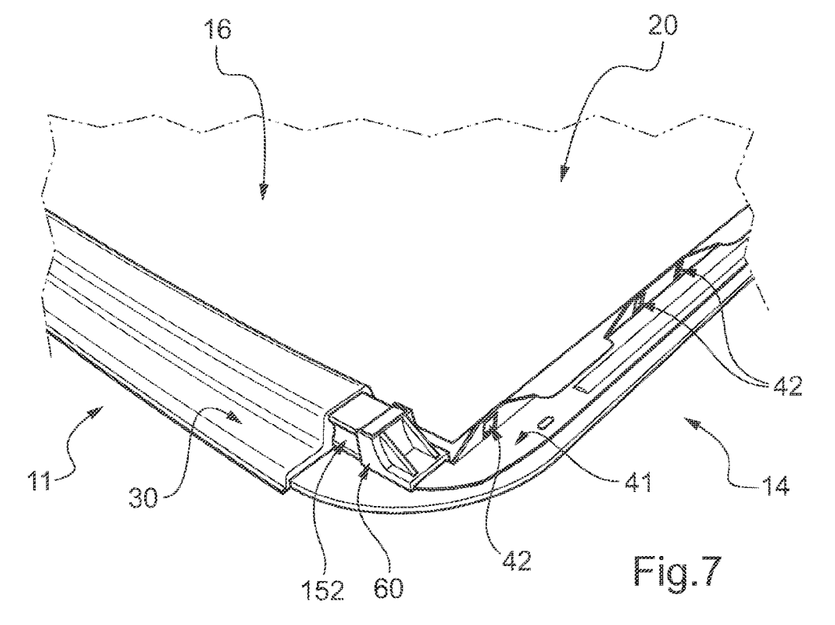
FIG. 7 illustrates a corner region of a glazed panel for a motor vehicle top according to an embodiment of the invention, which comprises the frame in FIG. 6 encapsulated in the polymer material at the periphery of its glass panel, with the polymer material being fictitiously removed locally in order to show the assembly of the reinforcement armature with the securing armature.
Figure 8:
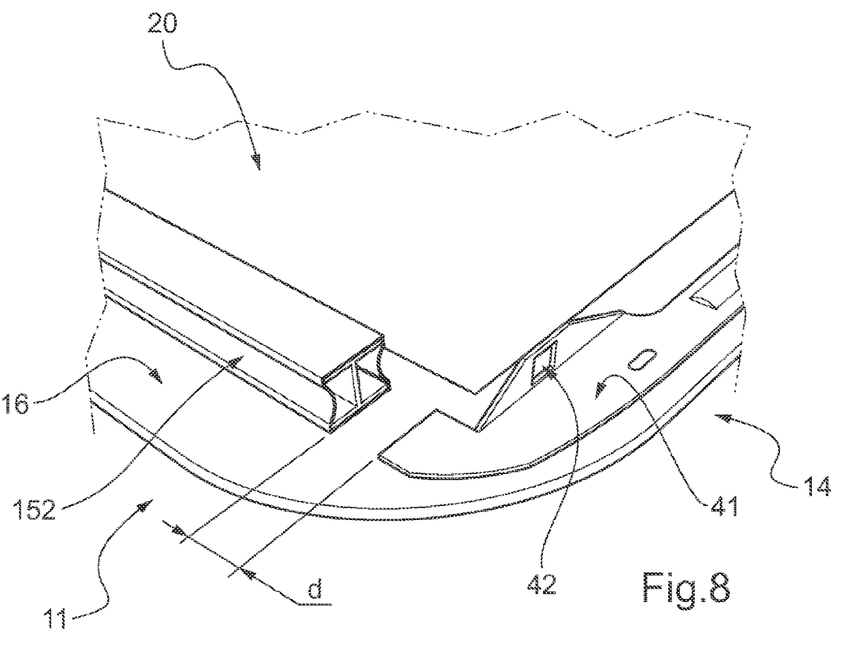
FIG. 8 is identical to FIG. 7, except that the connection part between the reinforcement armature and the securing armature is not represented.
Figure 9:
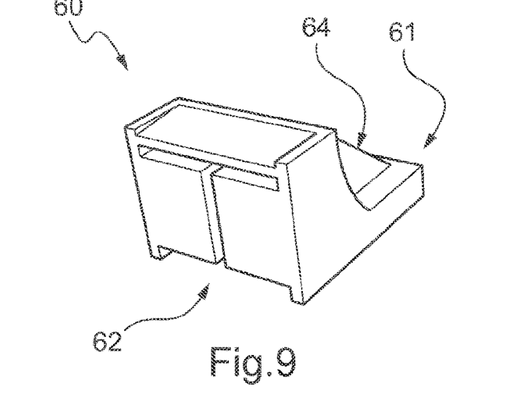
FIGS. 9 and 10 show two views in perspective of a connection part used in the example in FIG. 6.

The reinforcement armatures and the securing armatures are assembled in order to form a frame before they are rendered integral on the glass panel 20. FIG. 6 illustrates the example of a frame 50 of this type obtained by assembling two reinforcement armatures 152 in FIG. 5, provided with their skin 154, and two securing armatures 41, whereas FIG. 7 shows a local enlargement of a corner of the frame after rendering integral on the glass panel 20. The reinforcement armatures 152 and the securing armatures 41 are assembled to one another by means of their longitudinal ends by a respective intermediate part 60. FIGS. 9 and 10 show two views in perspective of an intermediate part 60. More particularly, in each case, a longitudinal end of a reinforcement armature 152 and a longitudinal end of the corresponding securing armature 41 are nested in an intermediate part 60. For this purpose, the intermediate part 60 comprises a first nesting port 62 which can receive the longitudinal end of the reinforcement armature 152, and a second nesting port 61 which can receive the longitudinal end of the securing armature 41. These two ports 61, 62 are preferably designed such that the nesting takes place with clamping suitable for permitting manual insertion, whilst ensuring retention which is sufficient to be able to handle the frame without it becoming disassembled before being rendered integral with the glass panel 20. Thus, the creation of the frame does not require any additional measure such as adhesion to keep it together, and it is therefore particularly simple, rapid and economical to carry out. The intermediate part 60 can be produced by molding of plastic material, which is particularly economical. This is preferably a plastic material reinforced with glass fibers, for example a polyamide 66. The intermediate parts 60 can comprise rigidification ribs 64. As a variant, it is the intermediate part 60 which is nested in a longitudinal end of the reinforcement armature and/or in a longitudinal end of the corresponding securing armature 41, instead of the inverse, at least if the form of the transverse cross-section of the armatures concerned makes this possible.

After rendering integral of the frame thus formed on the glass panel 20 by means of adhesive and/or overmolding of the peripheral polymer material 30, the intermediate parts 60 rigidify the glass panel 20 locally between the reinforcement armatures 152 and the securing armatures 41. They therefore limit the concentrations of stress in the corners of the glass panel 20, and consequently they reduce substantially the risk of breakage of the glass panel 20 in the corner areas under the windload effect, or during tests on the glazed panel which is loaded in the center and suspended by its corners. The intermediate parts 60 are preferably designed such that, after nesting with abutment, the distance of separation between the longitudinal end of the reinforcement armature 152 and that of the securing armature 41 is less than 30 mm, more preferably less than 20 mm, still more preferably less than 10 mm, and even more advantageously less than 5 mm. The distance is a minimum of 0 mm, except for a particular design where the ends of the armatures would be superimposed.

Use of intermediate parts 60 to assemble the reinforcement armatures 152 and the securing armatures 41 can have several advantages. These parts make it possible to assemble the reinforcement armatures and the securing armatures, irrespective of the form and structure of their respective ends. They make it possible to stop up the ends of the reinforcement armatures in the case when they are hollow, which prevents them from being filled with the peripheral polymer material 30 during the operation of injection molding. They also make it possible to assemble reinforcement armatures and securing armatures made of different materials, for example of composite material for the first and metal material for the second, which consequently could not be assembled by welding.

Alternatively, the securing armatures and the reinforcement armatures are nested directly in one another, which is possible in the case when their ends are compatible in order to permit such an insertion.

It will be understood that the description of the assembly of the reinforcement armatures 152 and of the securing armatures 41 in the form of a frame is applicable in general to reinforcement armatures and securing armatures with a different structure, and applies in particular to those with the references 51, 52, 252, 352, 452, 552, 652, without being limited to these.

The glazed panel 10 can be produced as follows.

After having assembled the reinforcement armatures and the securing armatures in the form of a frame, the latter and the glass panel 20 are positioned and retained in a mold provided for this purpose. Then, the peripheral polymer material 30 is overmolded on the assembly by injection into the mold. The mold is designed to overmold completely the reinforcement armatures and the intermediate parts, whereas the securing armatures are overmolded partly, in order to leave accessible the parts which are designed for securing of the glazed panel 10 on the opener translation mechanism of the motor vehicle top, by injection molding.

The fact of joining the reinforcement armatures and the securing armatures in the form of a frame makes it possible to simplify the putting into place of the armatures in the injection mold. This results in a reduction of the cycle time by putting into place a single element, i.e. the pre-assembled frame, in the injection mold, instead of four elements, i.e. each of the reinforcement armatures and the securing armatures. In addition, the frame thus formed can be positioned and retained in the injection mold exclusively by means of the non-overmolded parts of the securing armatures 41, by using for example systems based on positioning studs and/or magnets which in themselves are known. It is therefore possible to dispense with specific positioning measures for the reinforcement armatures according to the prior art, i.e. the prior securing by adhesive of the reinforcement armatures on the glass panel 20 by means of a laying template, or use of elements for positioning of the reinforcement armatures in the mold, such as magnets, or studs, which have the disadvantage of giving rise to finishing faults on the peripheral polymer material 30.

As previously stated, the peripheral polymer material 30 can alone ensure the rendering integral of the reinforcement armatures and the securing armatures on the glass panel 20, as well as of the intermediate parts 60.

As a variant, the frame can be secured on the glass panel 20 by adhesion, such as a double-sided adhesive strip or glue, before being placed in the mold for the purpose of addition of the peripheral polymer material 30.

Figure 17:
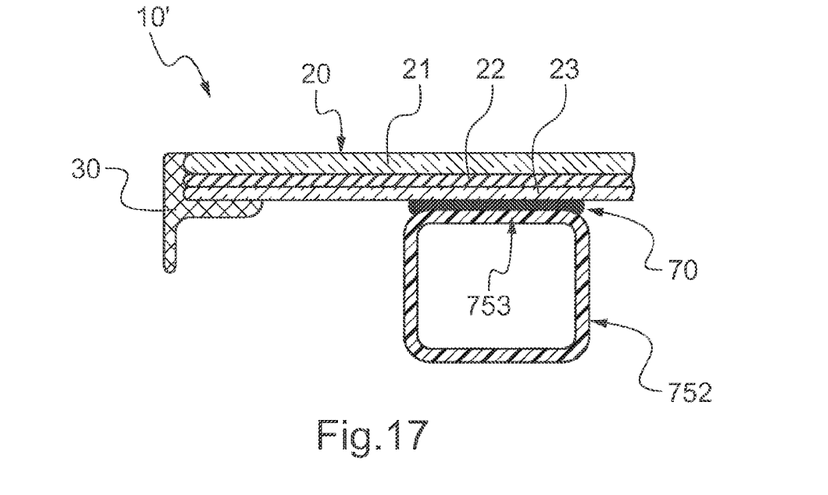
FIG. 17 is a schematic cross-section of the edge of a glazed panel for a motor vehicle top according to another embodiment of the invention.
Figure 18:
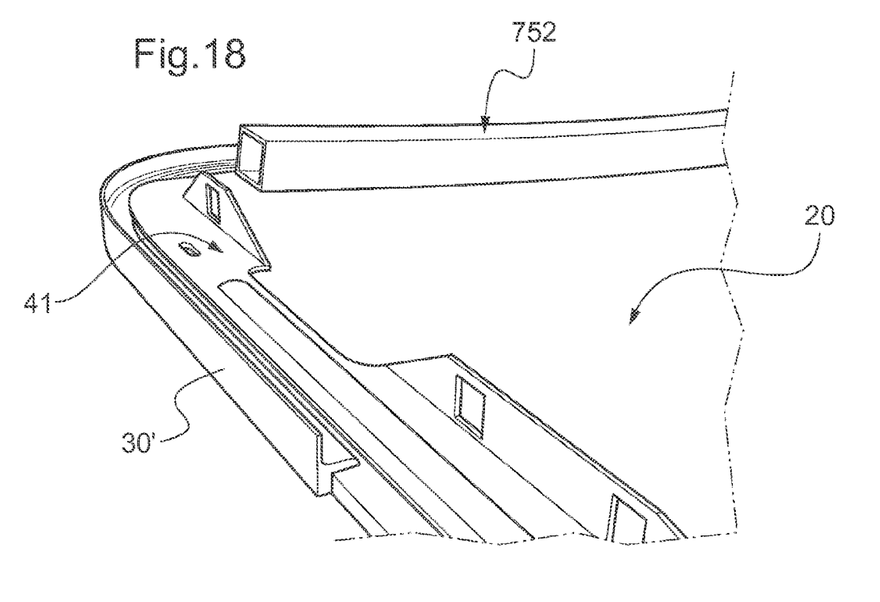
FIG. 18 illustrates a corner region of the glazed panel in FIG. 17.
Figure 19:
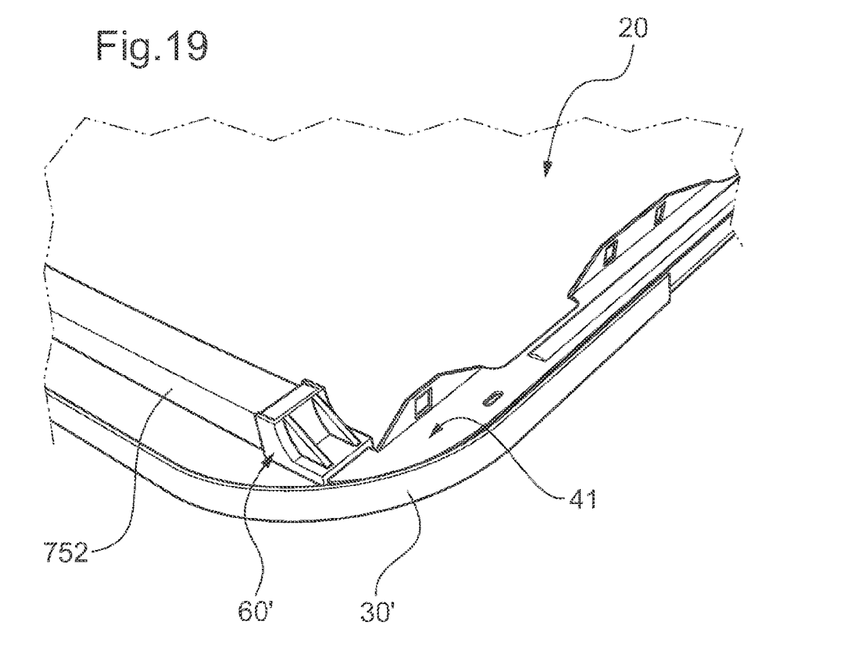
FIG. 19 is identical to FIG. 18, except that the connection part between the reinforcement armature and the securing armature is not represented.

In the embodiment described, the reinforcement armatures 51 and 52, or their variants 152, 252, 352, 452, 552, 652, the intermediate parts 60 and the securing armatures 41, are overmolded completely or partly by the peripheral polymer material 30. Alternatively, the frame formed by connection of the reinforcement armatures, the securing armatures, and, if applicable, the intermediate connection parts to one another, is secured on the glass panel 20 in a manner adjacent to the peripheral polymer material. This possibility is illustrated by FIGS. 17 to 19. In this example, the glass panel 20 is of the bi-laminated type, comprising an outer sheet of glass 21 and an inner sheet of glass 23 which are assembled to one another by a polymer layer 22, for example polyvinylbutyral (PVB). As in the preceding embodiment, the peripheral polymer material with the reference 30', in this case polyurethane or the like, is applied to the periphery of the laminated glass 20 by injection molding or any other appropriate method. Since it is not rendered integral on the glass panel 20 by the peripheral polymer material 30', the frame formed by the reinforcement armatures with the reference 752, the securing armatures 41, and if applicable connection to one another of the intermediate connection parts with the reference 60', is secured on the glass panel 20 by an adhesive 70, for example a glue or double-sided adhesive strip. It is preferable for each of the reinforcement armatures 752 and the securing armatures 41, as well as each of the intermediate parts 60', to be secured thus by adhesive on the glass panel 20.

It will be appreciated that the present invention is not limited to the examples and to the embodiment described and represented, but can be subjected to numerous variants which are accessible to persons skilled in the art.

The invention claimed is:

1. A frame designed to be rendered integral with a glass panel of a glazed panel, comprising:
   two longitudinal reinforcement armatures in order to reinforce the glass panel against deformations by flexure, and
   two longitudinal securing armatures in order to secure the glazed panel in an outer structure designed to receive the glazed panel;
   wherein:
   the two longitudinal reinforcement armatures and the two longitudinal securing armatures are joined in pairs by means of their longitudinal ends, in order to form the frame that is pre-assembled and having a closed periphery that is mountable as a one piece frame to said glass panel; and at least one end or each of the longitudinal ends of one or each of the longitudinal reinforcement armatures is joined to the corresponding longitudinal end of the adjacent longitudinal securing armature by means of a nesting assembly, wherein each of the two longitudinal reinforcement armatures and each of the two longitudinal securing armatures are recessed relative to an outer periphery of the glass panel.

2. The frame as claimed in claim 1, wherein said assembly is produced by nesting with clamped adjustment.

3. The frame as claimed in claim 2, wherein at least one or each of the longitudinal ends of one or each of the longitudinal reinforcement armatures is joined to the corresponding longitudinal end of the adjacent longitudinal securing armature solely by means of an assembly by nesting with clamped adjustment.

4. The frame as claimed in claim 1, wherein said assembly by nesting comprises a first nesting between the longitudinal end of the longitudinal reinforcement armature and an intermediate connection part, and a second nesting between the longitudinal end of the longitudinal securing armature and said intermediate connection part.

5. The frame as claimed in claim 1, wherein said assembly comprises nesting of the longitudinal end of the longitudinal reinforcement armature, and nesting of the longitudinal end of the longitudinal securing armature, in a single intermediate connection part.

6. The frame as claimed in claim 4, wherein a distance which separates the longitudinal end of the longitudinal reinforcement armature and the longitudinal end of the longitudinal securing armature which are nested in a single intermediate connection part is less than 30 mm.

7. The frame as claimed in claim 1, wherein the longitudinal end of the longitudinal securing armature has a bent part facing towards the adjacent longitudinal end of the longitudinal reinforcement armature.

8. The frame as claimed in claim 1, wherein one or each of the longitudinal reinforcement armature(s) is made of a metal material.

9. The frame as claimed in claim 1, wherein at least one of the longitudinal reinforcement armatures is made of composite material, and is produced in the form of a profiled part reinforced by longitudinal ribs and/or transverse ribs.

10. The frame as claimed in claim 1, wherein the longitudinal securing armatures are made of metal material.

11. The frame as claimed in claim 1, wherein the two longitudinal reinforcement armatures and the two longitudinal securing armatures are joined in pairs by means of their longitudinal ends, such as to ensure sufficient retention between them to be able to handle the frame without disassembling it, before rendering it integral with the glass panel.

12. A glazed panel comprising:
a glass panel with:
  a first and a second main faces; and
  a periphery, which defines for the glass panel a front edge, a rear edge, and a first and a second lateral edge which each extend between the front edge and the rear edge;
a peripheral polymer material arranged on the periphery of the glass panel; and a frame as claimed in claim 1, which is rendered integral with the first main face of the glass panel;
wherein:
each of the longitudinal reinforcement armatures of the frame is rendered integral on the first main face of the glass panel, the first in a region along the front edge and the second in a region along the rear edge,
each of the longitudinal securing armatures of the frame is rendered integral on the first main face of the glass panel, the first in a region along the first lateral edge and the second in a region along the second lateral edge, and
each of the two longitudinal reinforcement armatures and each of the two longitudinal securing armatures are recessed relative to an outer periphery of the glass panel.

13. The glazed panel as claimed in claim 12, wherein the longitudinal reinforcement armatures, and if applicable the intermediate connection parts, are completely encapsulated in the peripheral polymer material and the longitudinal securing armatures are partly overmolded by the peripheral polymer material.

14. The glazed panel as claimed in claim 12, wherein the longitudinal reinforcement armatures and the longitudinal securing armatures are situated completely outside the peripheral polymer material.

15. The glazed panel as claimed in claim 12, wherein one or each of the longitudinal reinforcement armatures comprises a face positioned facing the glass panel, which face forms a substantially continuous solid surface along the entire length of the longitudinal reinforcement armature.

16. The glazed panel as claimed in claim 12, wherein at least one of the longitudinal reinforcement armatures is a part profiled in the form of an "I", and is placed facing the glass panel with a face defined by one of the two horizontal bars of the "I".

17. The glazed panel as claimed in claim 16, wherein the longitudinal reinforcement armature in the form of a part profiled in the form of an "I" is encapsulated in the peripheral polymer material, two longitudinal cavities which are hollow or filled with a different polymer material being arranged along the reinforcement armature such that one of the two longitudinal cavities is on each side of the vertical upright of the cross-section in the form of an "I" between the two horizontal bars of the cross-section in the form of an "I".

18. The glazed panel as claimed in claim 12, wherein the glass panel is made of bi-laminated glass, and comprises a first sheet of glass with a thickness of 0.7 to 3.1 mm, and a second sheet of glass with a thickness of 1.4 to 3.1 mm, with the first sheet of glass defining the first main face of the glass panel, and the second sheet of glass defining the second main face of the glass panel.

19. The glazed panel as claimed in claim 12, wherein the peripheral polymer material is arranged around the entire periphery of the glass panel.

20. A motor vehicle comprising a glazed panel as claimed in claim 12, which is fitted in the top of the vehicle, wherein the two longitudinal reinforcement armatures extend transversely relative to the motor vehicle.

21. A method for production of a glazed panel as claimed in claim 12, comprising the steps of:
a) supplying or forming the frame, then
b) rendering the frame integral with a main face of the glass panel.

22. The method as claimed in claim 21, wherein, in the step b), rendering integral is carried out between the main face of the glass panel and each longitudinal reinforcement armature, and between the main face of the glass panel and each longitudinal securing armature.

23. The method as claimed in claim 22, wherein, in the step b), rendering integral is also carried out between the main face of the glass panel, and between each intermediate connection part.

24. The method as claimed in claim 21, wherein the step b) comprises:
- b1) putting the frame and the glass panel into position in a mold; and
- b2) filling the mold with a polymer material in order to add polymer material to the periphery of the glass panel which partly overmolds the longitudinal securing armatures and encapsulates the longitudinal reinforcement armatures.

25. The method as claimed in claim 24, wherein, in the sub-step b2), the longitudinal reinforcement armatures, and if applicable the intermediate connection parts, are completely encapsulated by the polymer material.

26. The method as claimed in claim 24, wherein the sub-step b1) comprises putting into position and retention in position of the frame in the mold exclusively by means of the longitudinal securing armatures.

27. The method as claimed in claim 24, wherein rendering integral of the longitudinal reinforcement armatures and of the longitudinal securing armatures, as well as, if applicable, the intermediate connection parts, on the glass panel, is ensured exclusively by the polymer material.

28. The frame as claimed in claim 1, wherein each longitudinal reinforcement armature of the two longitudinal reinforcement armatures comprises a face positioned facing the glass panel, said face extending from a first edge of the longitudinal reinforcement armature that forms at least part of an inner periphery of the frame to a second edge of the longitudinal reinforcement armature that forms at least part of an outer periphery of the frame, said face forming a substantially continuous solid flat surface along the entire length of the longitudinal reinforcement armature.

* * * * *